US010783019B1

(12) United States Patent
Kedar et al.

(10) Patent No.: US 10,783,019 B1
(45) Date of Patent: Sep. 22, 2020

(54) SINGLE PAGE APPLICATION CONTENT INJECTION

(71) Applicant: Imperva, Inc., Redwood City, CA (US)

(72) Inventors: Idan Kedar, San Francisco, CA (US); Ron Masas, Bat Yam (IL); Siva Vadivel, San Francisco, CA (US)

(73) Assignee: Imperva, Inc., Redwood City, CA (US)

( * ) Notice: Subject to any disclaimer, the term of this patent is extended or adjusted under 35 U.S.C. 154(b) by 0 days.

(21) Appl. No.: 16/424,340

(22) Filed: May 28, 2019

(51) Int. Cl.
G06F 9/54 (2006.01)
G06F 16/958 (2019.01)
G06F 21/31 (2013.01)
H04L 29/08 (2006.01)
H04L 29/06 (2006.01)

(52) U.S. Cl.
CPC ............ G06F 9/547 (2013.01); G06F 16/958 (2019.01); G06F 21/31 (2013.01); H04L 67/2804 (2013.01); G06F 2209/541 (2013.01); G06F 2221/2133 (2013.01); H04L 67/02 (2013.01); H04L 67/42 (2013.01)

(58) Field of Classification Search
None
See application file for complete search history.

(56) References Cited

U.S. PATENT DOCUMENTS 10,176,153 B1 * 1/2019 Sack
2013/0311863 A1 * 5/2012 Greg Gutkin
2014/0259145 A1 * 9/2014 Khandelwal
2017/0223049 A1 * 1/2017 Kuperman
2019/0332747 A1 * 10/2019 Raman

OTHER PUBLICATIONS

"Is there any way to intercept AJAX call responses in JavaScript?—Hashnode," downloaded from https://hashnode.com/post/is-there-any-way-to-intercept-ajax-call-responses-in-javascript-ciy14fnuy000bte53acydnklkl on May 13, 2019, 5 pages.

* cited by examiner

*Primary Examiner* — Syed A Roni
(74) *Attorney, Agent, or Firm* — Nicholson de vos Webster & Elliott LLP

(57) ABSTRACT

A method by a web application layer proxy communicatively coupled between a web application client and a web application server for injecting content into a web page provided by the web application server. The method includes intercepting the web page, inserting scripting language code into the web page that allows the web application client to process web application layer responses to be sent by the web application layer proxy to the web application client, sending the web page with the scripting language code inserted to the web application client, and responsive to receiving a web application layer request from the web application client, generating and sending, without involvement of the web application server, a web application layer response to the web application client that is to be processed by the web application client using the inserted scripting language code.

20 Claims, 8 Drawing Sheets

SINGLE PAGE APPLICATION CONTENT INJECTION

TECHNICAL FIELD

Embodiments of the invention relate to the field of computer networks, and more specifically, to injecting content into a web page provided by a web application server.

BACKGROUND ART

A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application layer responses (e.g., HTTP response messages) responsive to web application layer request messages (e.g., HTTP request messages) sent by those web application clients.

Web applications clients interact with web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients (e.g., using a rendering engine of a web browser). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page with a Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

One or more web application layer proxies may be deployed between web application clients and a web application server to act as an intermediary between them. Web application layer proxies are commonly deployed, for example, to protect a web application server from attacks by web application clients (e.g., web application firewalls). Web application layer proxies may inspect the traffic being sent between the web application clients and the web application server, including web application layer requests/responses (e.g., HTTP request/response messages), and can scan these web application layer requests/responses for attacks or potential attacks.

In traditional web applications, the navigation engine of the web browser generates and sends HTTP request messages to the web application server and the rendering engine of the web browser processes HTTP response messages provided by the web application server (e.g., which may include an HTML page that is possibly enriched with Javascript). A web application layer proxy (e.g., web application firewall) may inject content into the HTTP response messages being provided by the web application server by modifying the response body (i.e., modifying the HTML page) before it reaches the web browser (the injection may be performed over HTTP or HTTP Secure (HTTPS) (e.g., if the web application layer proxy has a valid certificate representing the web application server)). The rendering engine of the web browser will then render the modified response.

A single-page application (SPA) is a type of web application that provides a single web page that is rendered once by the rendering engine of the web browser, and where the web browser interacts with the web application server without refreshing the web page. Typically, Javascript code included in the web page by the web application server is used to manipulate the web page's structure/content (e.g., by manipulating the document object model (DOM) of the web page) in response to events (e.g., user interaction).

Since SPAs (and other types of web applications that update/modify web pages using Javascript code or other type of scripts/code included in the web page) do not necessarily rely on the web browser's rendering engine to process web application layer responses (but rely on Javascript code (or other type of scripting language code) to process web application layer responses), conventional web application layer proxies are not able to control what is rendered by the web browser by simply modifying the response body.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
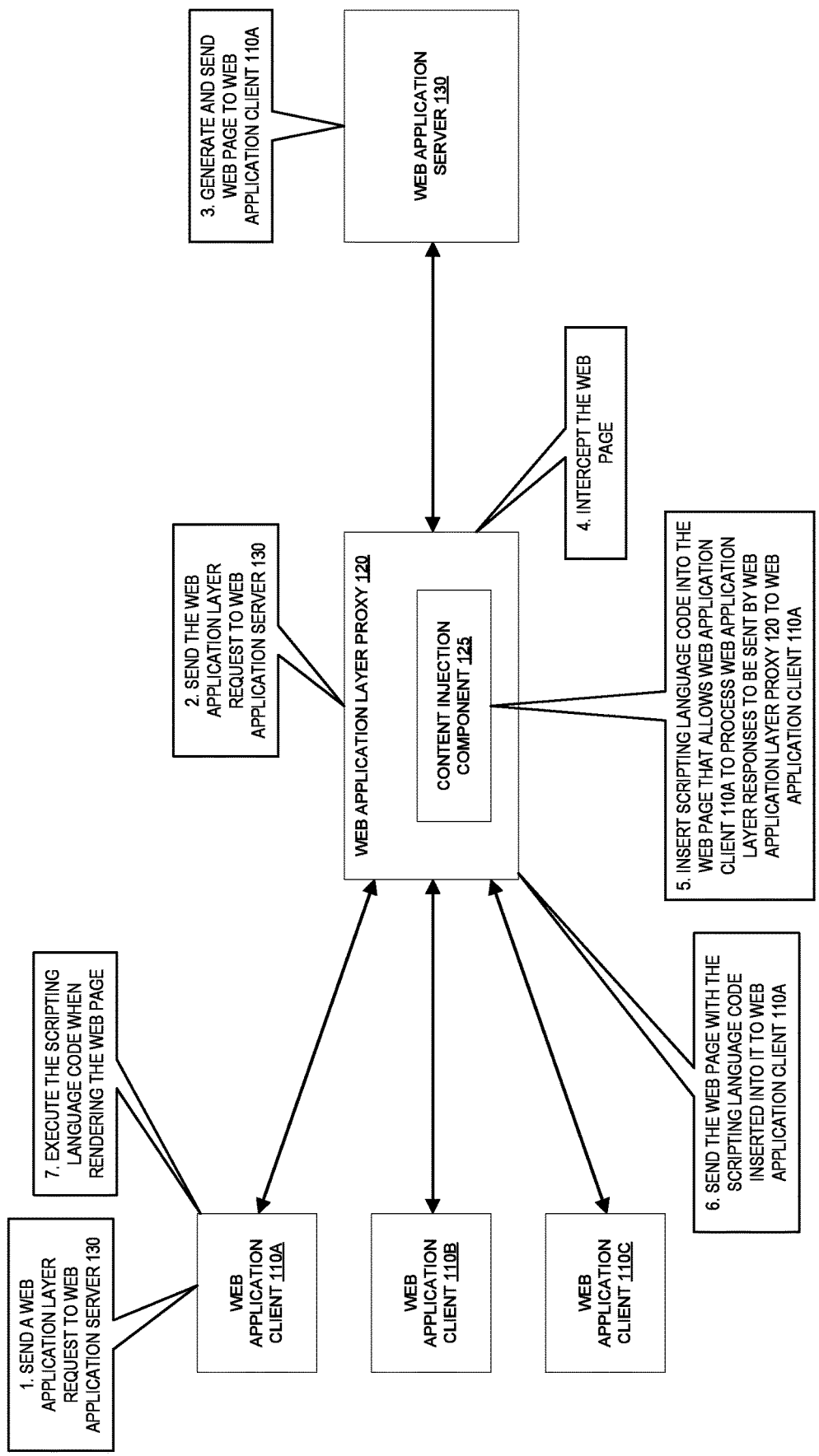
FIG. 1A is a block diagram illustrating a system for injecting content into a web page and operations of various components within the system, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

Embodiments described herein provide a technique for a web application layer proxy to inject content into a web page provided by a web application server. In particular, embodiments described herein enable a web application layer proxy to inject content into single page applications (SPAs) and other types of web applications that update/modify web pages using client-side scripting language code (e.g., Javascript code). In an exemplary embodiment, a web application layer proxy intercepts a web page being provided by a web application server to a web application client and inserts scripting language code into the web page that allows the web application client to process web application layer responses to be sent by the web application layer proxy to the web application client. The web application layer proxy then sends the web page with the scripting language code inserted into it to the web application client to cause the web application client to execute the inserted scripting language code when rendering the web page. The web application layer proxy may subsequently receive a web application layer request from the web application client and in response generate and send, without involvement of the web application server, a web application layer response to the web application client that is to be processed by the web application client using the scripting language code inserted by the web application layer proxy into the web page. Various embodiments are further described herein below.

FIG. 1A is a block diagram illustrating a system for injecting content into a web page and operations of various components within the system, according to some embodiments. As shown in the diagram, the system includes a web application layer proxy 120 that is communicatively coupled between web application clients 110A, 110B, and 110C and web application server 130. As used herein, a web application client 110 is an application that can access the content and/or services provided by web application servers 130 (e.g., a Hypertext Transfer Protocol (HTTP) client such as a web browser). As used herein, a web application server 130 is an application that provides content or services (e.g., provides web pages, eXtensive Markup Language (XML) documents, Javascript Object Notation (JSON) documents, or other type of content/services) upon the request of web application clients 110. Each of the web application clients 110 and the web application server 130 may be implemented by one or more electronic/network devices.

Each of the web application clients 110 may generate one or more web application layer requests (e.g., HTTP request messages such as a "POST" request messages or "GET" request messages) and send these web application layer requests to the web application server 130. In response to receiving web application layer requests, the web application server 130 may send corresponding web application layer responses (e.g., HTTP response messages) to the web application clients 110. For sake of illustration only, the diagram shows three web application clients 110 that are communicatively coupled to web application server 130 via the web application layer proxy 120. It should be understood that there can be more or less web application clients 110 than shown in the diagram.

The web application layer proxy 120 functions as an intermediary between the web application clients 110 and the web application server 130. The web application layer proxy 120 may sit inline to the traffic between the web application clients 110 and the web application server 130 such that it can see the traffic being sent between them. In one embodiment, the web application layer proxy 120 is a web application firewall that protects the web application server 130 against various types of web application layer attacks from web application clients 110 (e.g., Structured Query Language injection (SQLi) attacks, Cross-Site Request Forgery (CSRF) attacks, and Remote File Inclusion (RFI) Attacks). While in some embodiments (e.g., embodiments where the web application layer proxy 120 implements a web application firewall) the web application layer proxy 120 is a reverse proxy, in other embodiments the web application layer proxy 120 may be a forward proxy. The web application layer proxy 120 may be implemented by one or more electronic/network devices.

The web application layer proxy 120 and/or the web application server 130 may be deployed in a cloud (e.g., a cloud provided by a cloud provider such as AMAZON®, MICROSOFT®, etc.) or on-premise (e.g., in an enterprise network). In an exemplary arrangement, the web application layer proxy 120 is deployed in the cloud while the web application server 130 is deployed on-premise, and any web application layer requests generated by the web application clients 110 that are intended for the web application server 130 are first directed to the web application layer proxy 120 in the cloud (e.g., by changing Domain Name Service (DNS) records) before being sent to the on-premise web application server 130. It should be understood that other arrangements are also possible. For example, both the web application layer proxy 120 and the web application server 130 may be deployed in the cloud. Although FIG. 1A shows deployment of a single web application layer proxy 120, some embodiments may deploy a plurality of web application layer proxies 120 (that are geographically dispersed) to function as intermediaries between the web application clients 110 and the web application server 130.

Operations for injecting content into a web page will now be described with reference to FIGS. 1A-C. Referring to FIG. 1A, at operation 1, web application client 110A sends a web application layer request to the web application server 130. In this example, the web application layer request includes a request for a web page provided by the web application server 130.

At operation 2, the web application layer proxy 120 intercepts the web application layer request and sends the web application layer request to the web application server 130. In one embodiment, the web application layer proxy 120 inspects the web application layer request for attacks before sending the web application layer request to the web application server 130.

At operation 3, responsive to receiving the web application layer request, the web application server 130 generates and sends the requested web page (as a web application layer response) to web application client 110A. In one embodiment, the web page is the main web page of a SPA. In one embodiment, the web page includes scripting language code (e.g., Javascript code) for web application client 110A (i.e., to be executed by web application client 110A) to create a standard web application layer request object (e.g., an XMLHttpRequest object or a fetch object) that is used to send web application layer requests to the web application server 130.

At operation 4, the web application layer proxy 120 intercepts the web page and at operation 5, a content injection component 125 of the web application layer proxy 120 inserts scripting language code into the web page that allows web application client 110A to process web application layer responses to be sent by the web application layer proxy 120 to web application client 110A. The insertion of the scripting language code can be performed over HTTP or HTTP Secure (HTTPS) (e.g., if the web application layer proxy has a valid certificate representing the web application server). In one embodiment, the scripting language code is inserted into the web page such that it will be executed by web application client 110A before existing scripting language code already included in the web page (e.g., inserted at the beginning of the web page).

In one embodiment, the scripting language code includes code for web application client 110A to override the standard web application layer request object with a customized web application layer request object, where the customized web application layer request object provides a customized function that overrides a standard function provided by the standard web application layer request object. The customized function may include code for web application client 110 to process web application layer responses to be sent by the web application layer proxy 120 to web application client 110A and/or web application layer requests to be sent by web application client 110A to the web application layer server 130. For example, the customized function may include code for web application client 110A to manipulate a structure (e.g., document object model (DOM)) of the web page to display content included in a web application layer response (e.g., a Completely Automated Public Turing Test to Tell Computers and Humans Apart (CAPTCHA) user interface or waring page indicating an access violation) to be sent by the web application layer proxy 120 to web application client 110A. In one embodiment, the customized function includes code for redirecting web application client 110A to another web page.

In one embodiment, the standard web application layer request object that is overridden is an XMLHttpRequest object and the standard function that is overridden is any one of a send function and an open function. For example, the scripting language code may include code for web application client 110 to override a standard XMLHttpRequest object (e.g., that is built-in to the web browser) with a customized XMLHttpRequest object, where the customized XMLHttpRequest object provides a customized send function. The customized send function may include code for web application client 110 to process web application layer responses to be sent by the web application layer proxy 120 to web application client 110A (e.g., code to manipulate the DOM of the web page to display content included in those web application layer responses). In another embodiment, the standard web application layer request object that is overridden is a fetch object (e.g., fetch function of a Fetch application programming interface (API)) instead of an XMLHttpRequest object. Overriding the standard web application layer request object with the customized web application layer request object ensures that the customized web application layer request object is invoked when the existing scripting language code in the web page (i.e., the scripting language code inserted into the web page at the web application server 130) creates a web application layer object.

Exemplary scripting language code (written in Javascript in this example) that the content injection component 125 of the web application layer proxy 120 may insert into a web page is provided below:

```
<script type='text/javascript'>
XMLHttpRequest = class extends XMLHttpRequest {
    send( ) {
        this._onreadystatechange = this.onreadystatechange;
        this.onreadystatechange = ( ) => {
            if (this.response. getAllResponseHeaders ( ) [x-content-
            injection] == ('catpcha')) { //Checks if response is a "special" page
            that the hooks should process
                document.getElementsByTagName('body')[0].style.opacity = 0.2
                document.getElementsByTagName('body')[0].style.background = "white"
                var div = document.createElement('div');
                div.setAttribute("class", "captcha");
                div.innerHTML = this.response;
                if (document.getElementsByClassName("captcha").1ength === 0) { //
                check if "captcha" already exists in page
                document.getElementsByTagName(\'html\')[0].prepend(div);
                // add the captcha div to the page
                this.abort( );
            }
        }
        if (typeof this._onreadystatechange === 'function') {
            this._onreadystatechange( ); // call original event handler
        }
    };
    super.send( ); // finally, we call the original send function
    };
};
</script>
```

The above exemplary scripting language code creates a customized XMLHttpRequest object that overrides the standard XMLHttpRequest object. The customized XMLHttpRequest object provides a customized send function (overriding the standard send function) that hooks into the web application layer response processing process (using the onreadystatechage property of the XMLHttpRequest object) and provides code for handling web application layer responses. In this example, the code determines whether a received web application layer response is a special response/page provided by the web application layer proxy 120 based on a header of the web application layer response. If it is determined that the web application layer response is a special response/page provided by the web application layer proxy 120, then elements of the user interface of the web page are disabled (e.g., made opaque) and the content included in the web application layer response is added to the web page (in this example it is assumed that the content is a CAPTCHA user interface). If it is determined that the received web application layer response is not a special response/page provided by the web application layer proxy 120, then the original event handler is called (to allow the web application layer response to be processed normally). In some embodiments, the code may determine whether the web application layer response is a special response/page provided by the web application layer proxy 120 using other means (e.g., based on looking for certain string that are known to be in special responses/pages). Finally, the standard send function is called (thus the customized send function can be seen as being a wrapper for the standard send function).

In one embodiment, the scripting language code includes code for web application client 110A to call a service worker API to process web application layer responses to be sent by the web application layer proxy 120 to web application client 110A and/or web application layer requests to be went by web application client 110A to the web application server 130. That is, calls to the service worker API may be used to process web application layer responses/requests instead of overriding web application layer request objects. However, service worker APIs are not yet widely supported, do not work over unencrypted HTTP, and may be subject to tampering (e.g., tampering with "navigation.serviceWorker").

At operation 6, the web application layer proxy 120 sends the web page with the scripting language code inserted into it to web application client 110A, which, at operation 7, causes web application client 110A to execute the scripting language code inserted by the web application layer proxy 120 when rendering the web page.

Figure 1B:
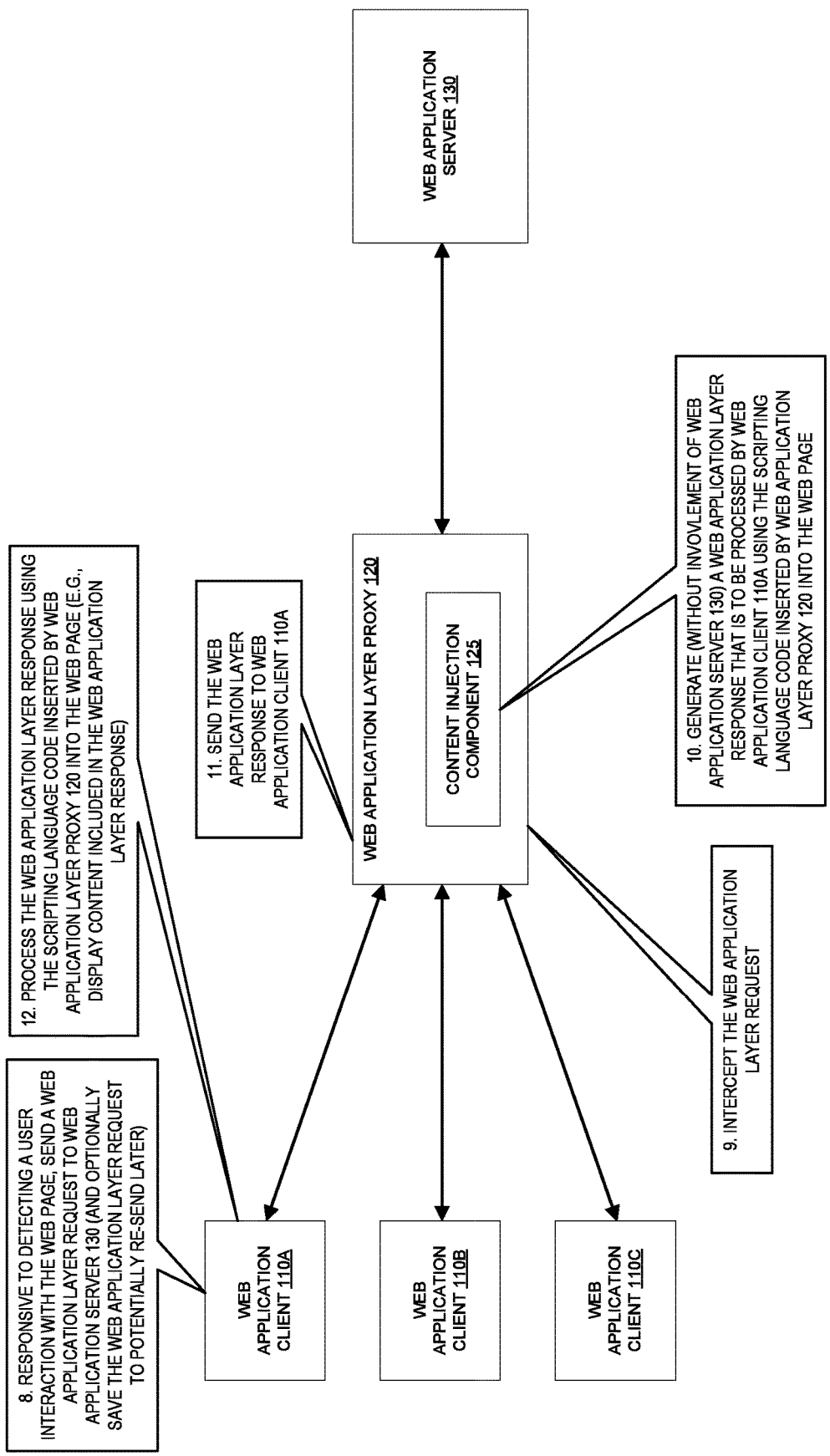
FIG. 1B is a block diagram illustrating further operations of various components within the system, according to some embodiments.

Referring now to FIG. 1B, at operation 8, responsive to detecting a user interaction with the web page (e.g., an end user clicking on or hovering a cursor over an element of the web page), web application client 110A sends a web application layer request to the web application server 130. In one embodiment, the scripting language code inserted by the web application layer proxy 120 into the web page includes code for web application client 110A to save the web application layer request before sending it to the web application server 130. Thus, web application client 110A may save the web application layer request (e.g., to potentially re-send the web application layer request at a later time (e.g., following user interaction with the content that is to be injected, as will be described in further detail below)). The web application layer request may be saved, for example, in a window object or a document object provided by the scripting language environment.

At operation 9, the web application layer proxy 120 intercepts the web application layer request and at operation 10, the content injection component 125 of the web application layer proxy 120 generates, without involvement of the web application server 130, a web application layer response (a special response/page) that is to be processed by web application client 110A using the scripting language code inserted by the web application layer proxy 120 into the web page. At operation 11, the web application layer proxy 120 sends this web application layer response to web application client 110A. The web application layer response may include content (static or dynamic (interactive) content) that is to be injected into the web page. The web application layer proxy 120 may decide to inject content into the web page without involvement of the web application server 130 for a variety of reasons. For example, the web application layer proxy 120 may want to inject a CAPTCHA user interface into the web page if it suspects that web application client 110A is being operated/controlled by a bot (as opposed to a human end user). As another example, the web application layer proxy 120 may want to inject a warning page into the web page if it determines that web application client 110A is in violation of an access policy. These are just a few examples of content that can be injected into the web page. It should be understood that content injection component 125 of the web application layer proxy 120 may inject other types of content (e.g., which may include content related to security (such as the examples given above) and/or content unrelated to security) into the web page, which may vary depending on the specific implementation. In one embodiment, the web application layer proxy 120 injects a generic Iframe into the web page, where the Iframe can include content of another web page (which may include static and/or dynamic content provided by a third party entity (e.g., an entity that is different from the entity providing the original web page into which the Iframe is injected).

At operation 12, web application client 110A processes the web application layer response using the scripting language code inserted by the web application layer proxy 120 into the web page. For example, web application client 110A may use the scripting language code (e.g., by executing portions of it) to display content included in the web application layer response (e.g., to display a CAPTCHA user interface, a warning page, or Iframe content).

In some cases, it is desirable to automatically re-send the original web application layer request to the web application server 130. For example, it may be desirable to re-send the original web application layer request to the web application server 130 after the end user successfully solves a CAPTCHA user interface provided by the web application layer proxy 120. Thus, in one embodiment, the scripting language code inserted by the web application layer proxy into the web page includes code for web application client 110A to re-send the original web application layer request to the web application server 130 responsive to receiving a further web application layer response from the web application layer proxy 120 (e.g., a web application layer response indicating the end user successfully solved the CAPTCHA). In one embodiment, the scripting language code includes code for web application client 110A to determine the original web application layer request based on information previously stored in a window object or a document object. In another embodiment, the scripting language code includes code for web application client 110A to determine the original web application layer request based on accessing a navigation history (e.g., web browser history) of web application client 110A.

Figure 1C:
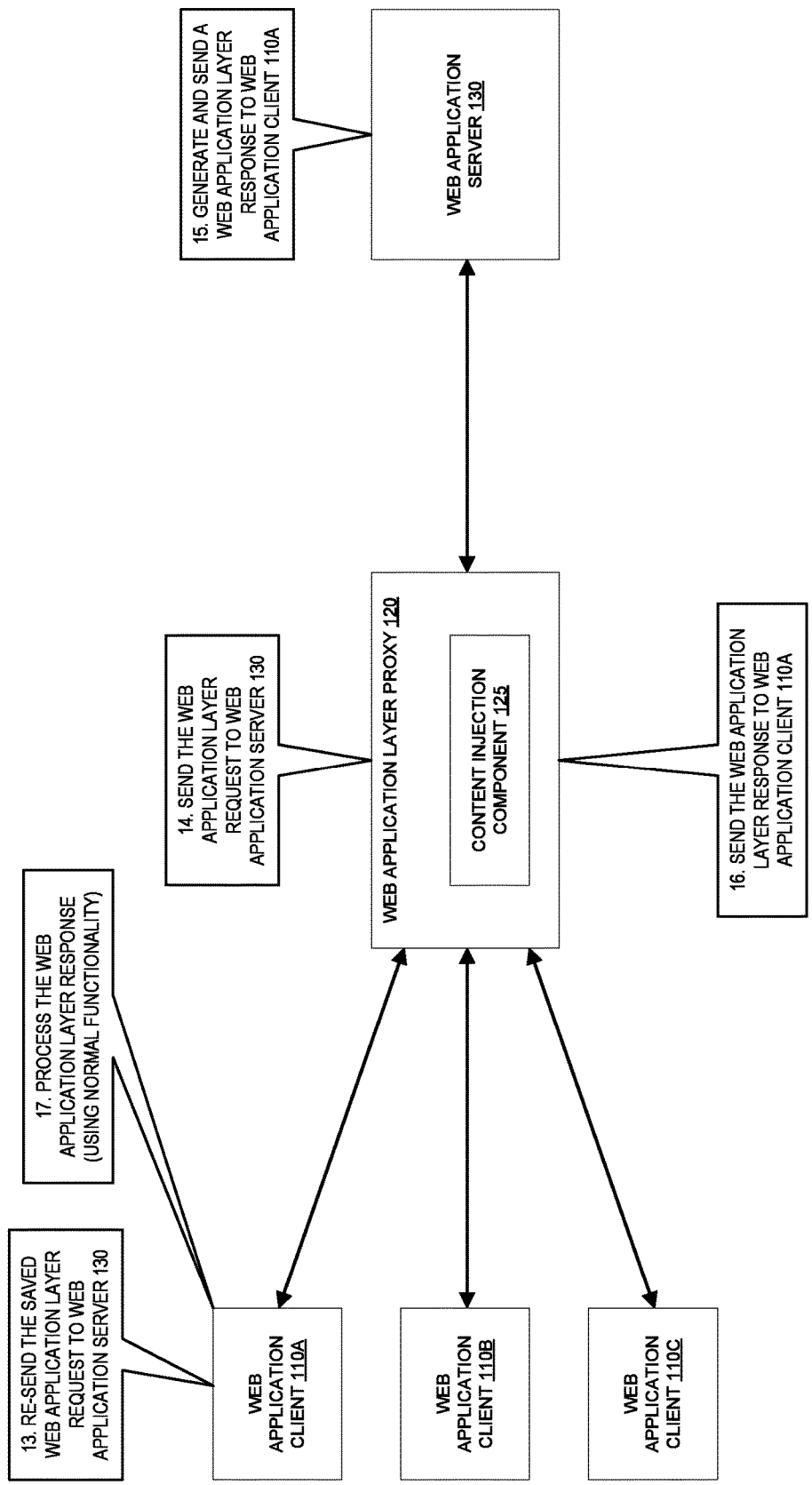
FIG. 1C is a block diagram illustrating further operations of various components within the system, according to some embodiments.

Referring now to FIG. 1C, at operation 13, web application client 110A re-sends the saved web application layer request (e.g., which was saved at operation 8 in FIG. 1B) to the web application server 130 (e.g., after the end user successfully solves the CAPTCHA) and at operation 14, the web application layer proxy 120 intercepts the web application layer request and sends it to the web application server 130.

At operation 15, responsive to receiving the web application layer request, the web application server 130 generates and sends a web application layer response to web application client 110A and at operation 16, the web application layer proxy 120 intercepts the web application layer response and sends it to web application client 110A. At operation 17, web application client 110A processes the web application layer response using normal functionality (e.g., using the original event handler).

While operations have been shown and described with respect to web application layer requests/responses involving web application client 110A, it should be understood that similar operations can be performed to inject content into web pages provided to other web application clients 110 (e.g., web application client 110B and web application client 110C). Also, while operations have been shown and described in a context where there is a single web application server 130, it should be understood that the web application layer proxy 120 may inject content into web pages provided by multiple different web application servers 130 providing different web pages (whether they are "traditional" web pages or SPA web pages).

Embodiments described herein offers several advantages over existing content injection mechanisms. For example, an advantage of embodiments described herein is that they allow a web application layer proxy 120 to inject content into SPAs (or other types of web applications that process web application layer responses using client-side scripting language code). This is in contrast to conventional web application layer proxies, which are only able to inject content into "traditional" web applications and are not able to inject content into SPAs. Another advantage of embodiments described herein is that they allow injecting content into a web page without involving and/or without integrating with the web application server.

Figure 2A:
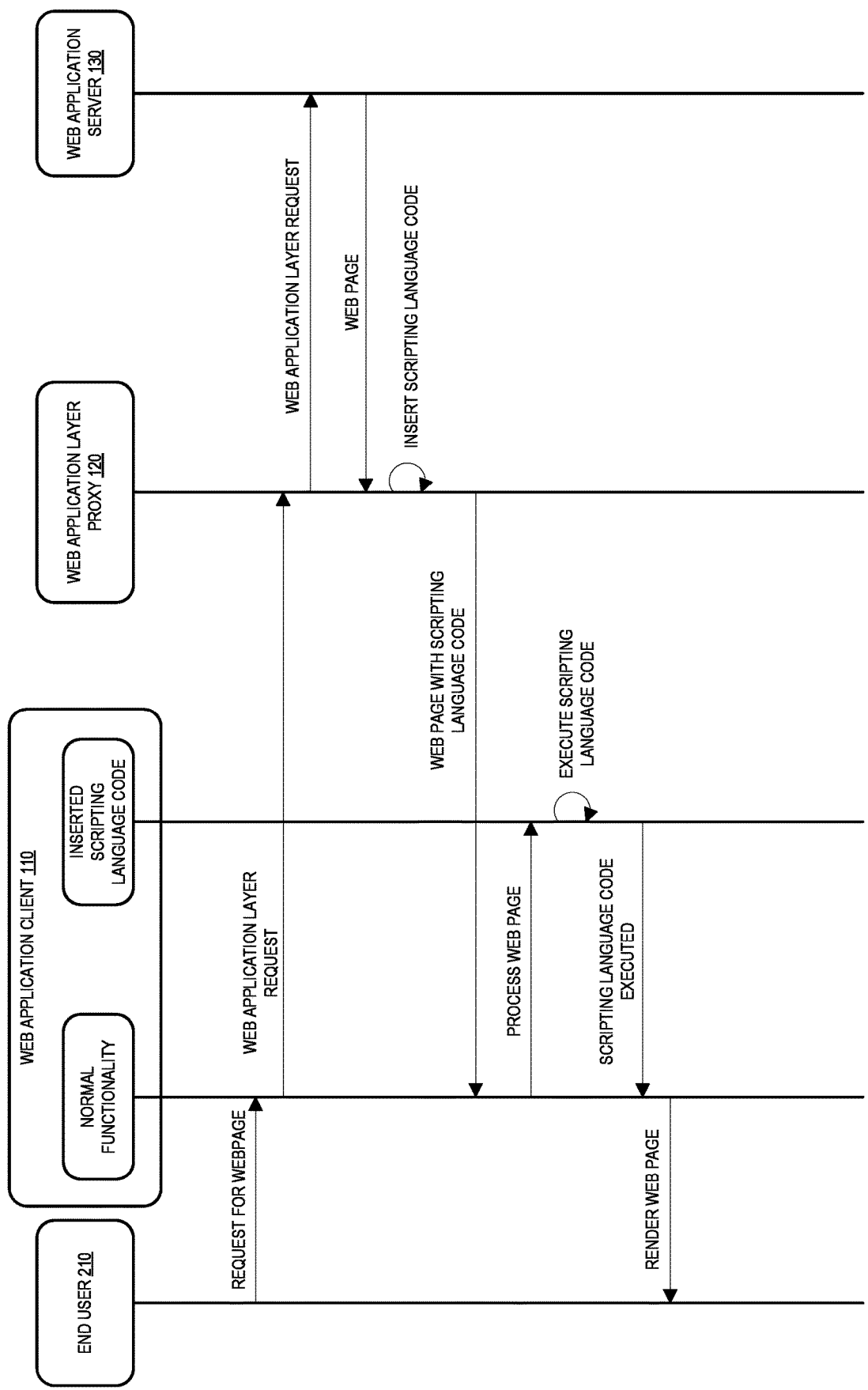
FIG. 2A is a diagram illustrating operations for injecting content into a web page, according to some embodiments.
Figure 2B:
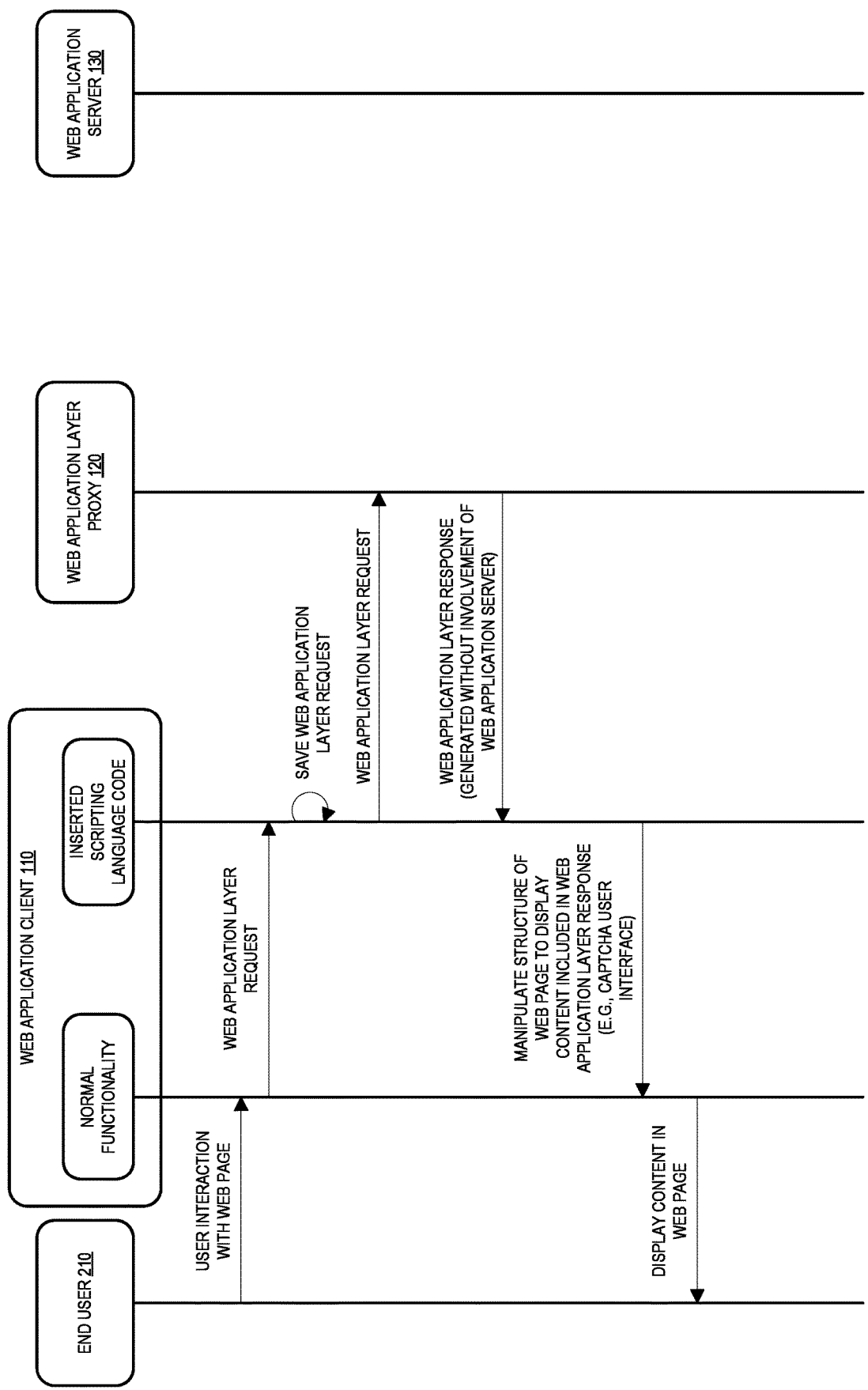
FIG. 2B is a diagram illustrating further operations for injecting content into a web page, according to some embodiments.
Figure 2C:
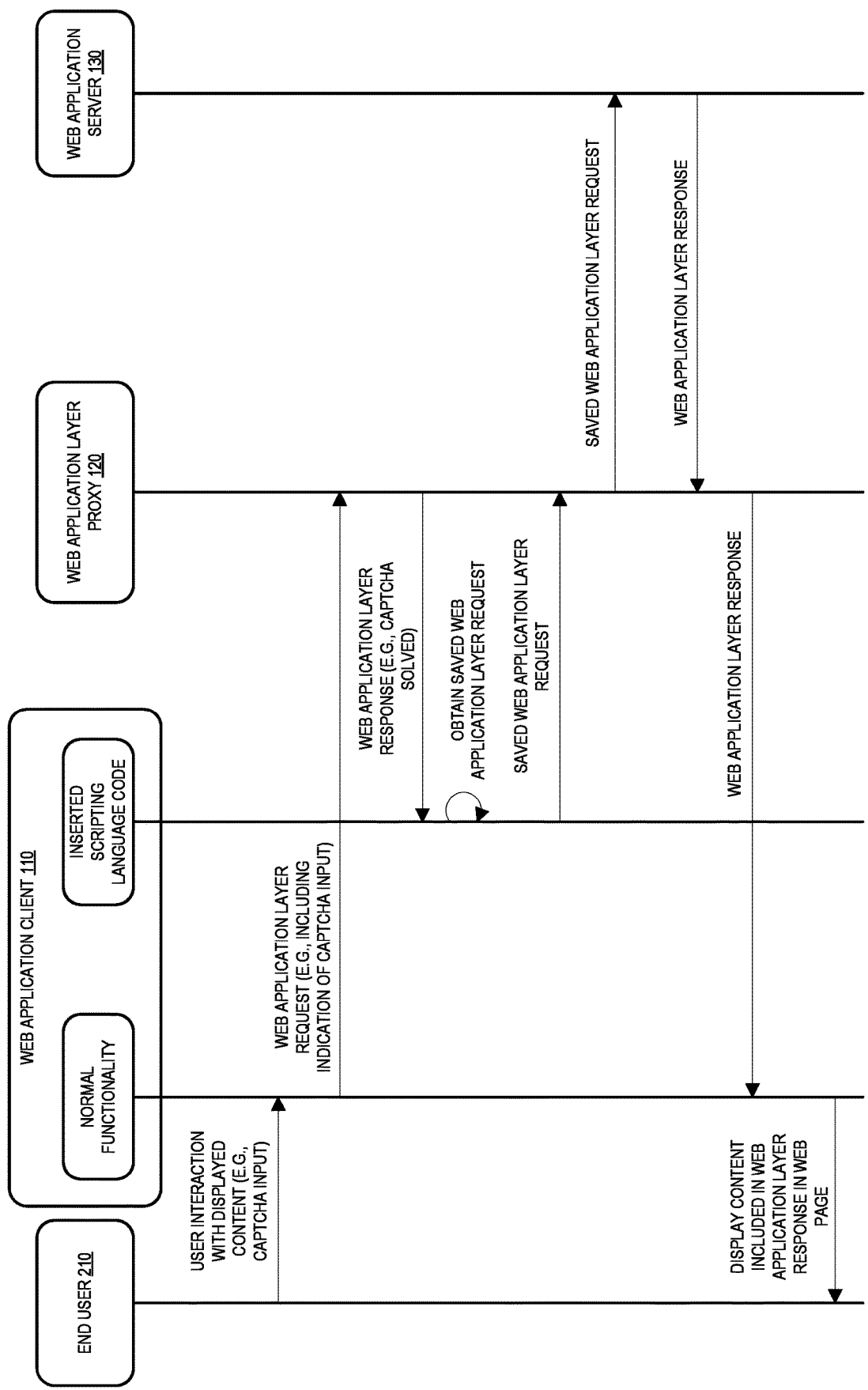
FIG. 2C is a diagram illustrating further operations for injecting content into a web page, according to some embodiments.

FIGS. 2A-C are diagrams illustrating operations for injecting content into a web page, according to some embodiments. An end user 210 makes a request for a web page using the web application client 110. As shown in the diagram, the functionality of the web application client 110 is divided into normal functionality (e.g., functionality built-in to the web browser) and functionality provided by the inserted scripting language code. The normal functionality of the web application client 110 sends a web application layer request (requesting a web page) to the web application server 130 and this web application layer request is intercepted by the web application layer proxy 120. The web application layer proxy 120 then sends the web application layer request to the web application server 130 (e.g., assuming that the web application layer proxy 120 determines that the web application layer request is suitable for sending to the web application server 130 (e.g., based on determining that the web application layer request does not include an attack)). In response, the web application server 130 generates and sends the web page (as a web application layer response) to the web application client 110 and this web page is intercepted by the web application layer proxy 120. The web application layer proxy 120 inserts scripting language code into the web page that allows web application client 110 to process web application layer responses to be sent by the web application layer proxy 120 to the web application client 110 and sends the web page with the scripting language code inserted into it to the web application client 110. The normal functionality of the web application client 110 processes the web page, which involves executing the scripting language code that was inserted by the web application layer proxy 120 when rendering the web page for viewing by the end user 210.

Referring now to FIG. 2B, after the web page has been rendered, the end user 210 may interact with the web page in a manner that causes the normal functionality of the web application client to generate a web application layer request to be sent to the web application server 130 (e.g., the end user 210 clicking a link on the web page). In one embodiment, the inserted scripting language code of the web application client 110 saves this web application layer request before it is sent to the web application server 130. This web application layer request is intercepted by the web application layer proxy 120. The web application layer proxy 120 then generates a web application layer response (e.g., including a CAPTCHA user interface) without involvement of the web application server 130 and sends the web application layer response to the web application client 110. The inserted scripting language code of the web application client 110 then manipulates the structure (e.g., DOM) of the web page to display the content included in the web application layer response (e.g., display the CAPTCHA user interface). The normal functionality of the web application client then displays the content in the web page.

Referring now to FIG. 2C, the end user 210 may interact with the displayed content (e.g., by providing a CAPTCHA input). In response, the normal functionality of the web application client 110 generates a web application layer request (e.g., including indication of the CAPTCHA input by the end user 210) and sends this web application layer request to the web application layer proxy 120. In response, the web application layer proxy 120 sends a web application layer response (e.g., indicating whether the end user 210 successfully solved the CAPTCHA) to the web application client 110. The inserted scripting language code of the web application client 110 then obtains the saved web application layer request and sends the saved web application layer request to the web application server 130 to retrieve the originally requested web page (e.g., assuming that the end user 210 successfully solved the CAPTCHA). This web application layer request is intercepted by the web application layer proxy 120, which sends the web application layer request to the web application server 130 (again assuming that the web application layer proxy 120 determines that the web application layer request is suitable for sending to the web application server 130). In response, the web application server 130 generates and sends a web application layer response to the web application client 110, which is intercepted by the web application layer proxy 120. The web application layer proxy 120 sends this web application layer response to the web application client 110. The normal functionality of the web application client 110 then processes the web application layer response to display content included in the web application layer response in the web page.

Figure 3:
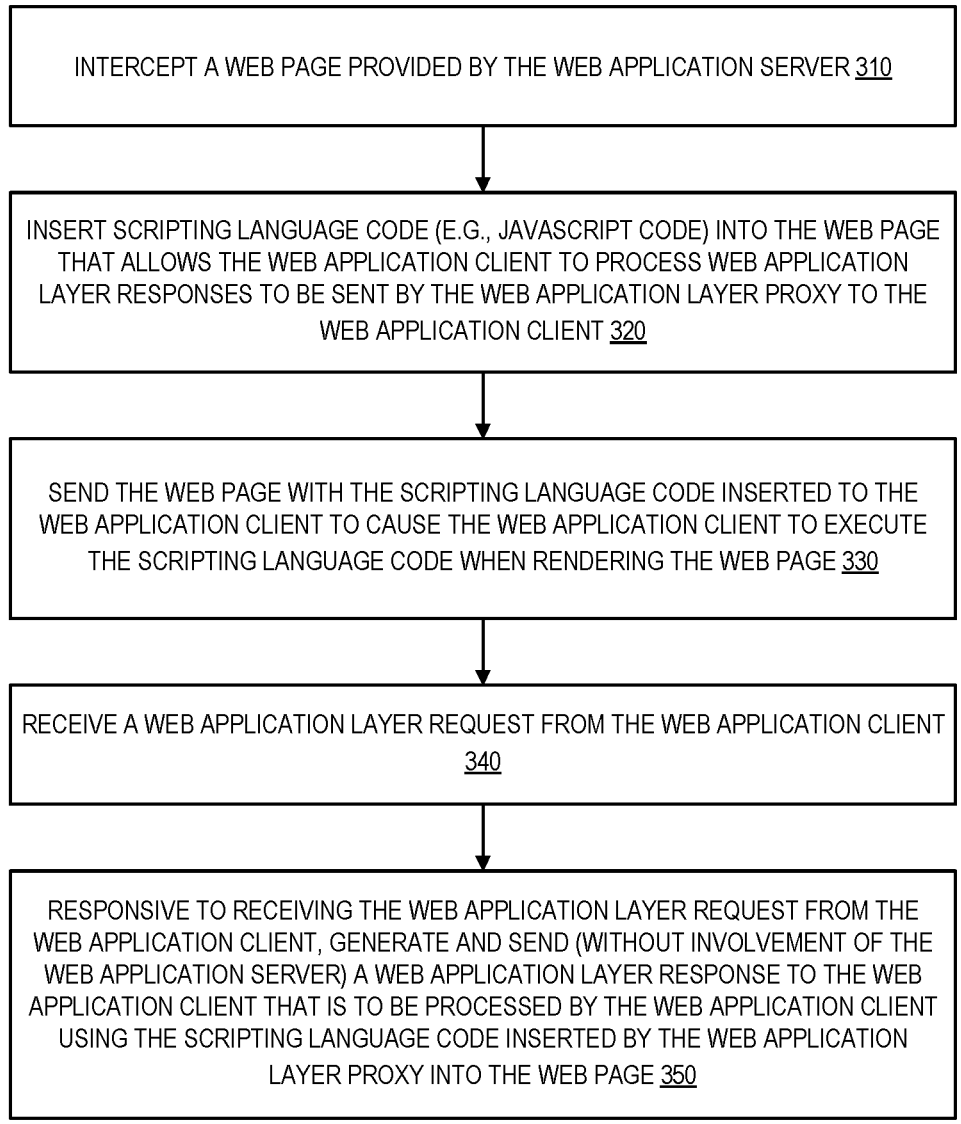
FIG. 3 is a flow diagram of a process for injecting content into a web page, according to some embodiments

FIG. 3 is a flow diagram of a process for injecting content into a web page, according to some embodiments. In one embodiment, the process is implemented by one or more network devices implementing a web application layer proxy 120.

At block 310, the web application layer proxy intercepts a web page provided by the web application server.

At block 320, the web application layer proxy inserts scripting language code (e.g., Javascript code) into the web page that allows the web application client to process web application layer responses to be sent by the web application layer proxy to the web application client. In one embodiment, the scripting language code is inserted into the web page such that it is executed by the web application client before existing scripting language code included in the web page. In one embodiment, the scripting language code includes code for the web application client to override a standard web application layer request object with a customized web application layer request object, where the customized web application layer request object provides a customized function that overrides a standard function provided by the standard web application layer request object. In one embodiment, the standard web application layer request object that is overridden is an XMLHttpRequest object. In such an embodiment, the standard function that is overridden may be any one of a send function and an open function. In one embodiment, the standard web application layer request object that is overridden is a fetch object. In one embodiment, the scripting language code includes code for redirecting the web application client to another web page. In one embodiment, the scripting language code includes code for the web application client to call a service worker API to process the web application layer responses to be sent by the web application layer proxy to the web application client and/or web application layer requests to be sent by the web application client to the web application server.

At block 330, the web application layer proxy sends the web page with the scripting language code inserted to the web application client to cause the web application client to execute the scripting language code when rendering the web page.

At block 340, the web application layer proxy receives a web application layer request from the web application client.

At block 350, responsive to receiving the web application layer request from the web application client, the web application layer proxy generates and sends, without involvement of the web application server, a web application layer response to the web application client that is to be processed by the web application client using the scripting language code inserted by the web application layer proxy into the web page. In one embodiment, the scripting language code includes code for the web application client to manipulate a structure (e.g., DOM) of the web page to display content included in the web application layer response sent by the web application layer proxy to the web application client. In one embodiment, the content includes a CAPTCHA user interface. In one embodiment, the content includes a warning page indicating an access violation.

In one embodiment, the scripting language code further allows the web application client to process web application layer requests to be sent by the web application client to the web application server. In such an embodiment, the scripting language code may include code for the web application client to re-send the web application layer request to the web application server responsive to receiving a further web application layer response (e.g., indicating that the end user successfully solved the CAPTCHA) from the web application layer proxy. In one embodiment, the scripting language code further includes code for the web application client to save the web application layer request to be re-sent in a window object or document object provided by a scripting language environment. In one embodiment, the scripting language code further includes code for the web application client to access a navigation history of the web application client to determine the web application layer request to re-send.

Figure 4:
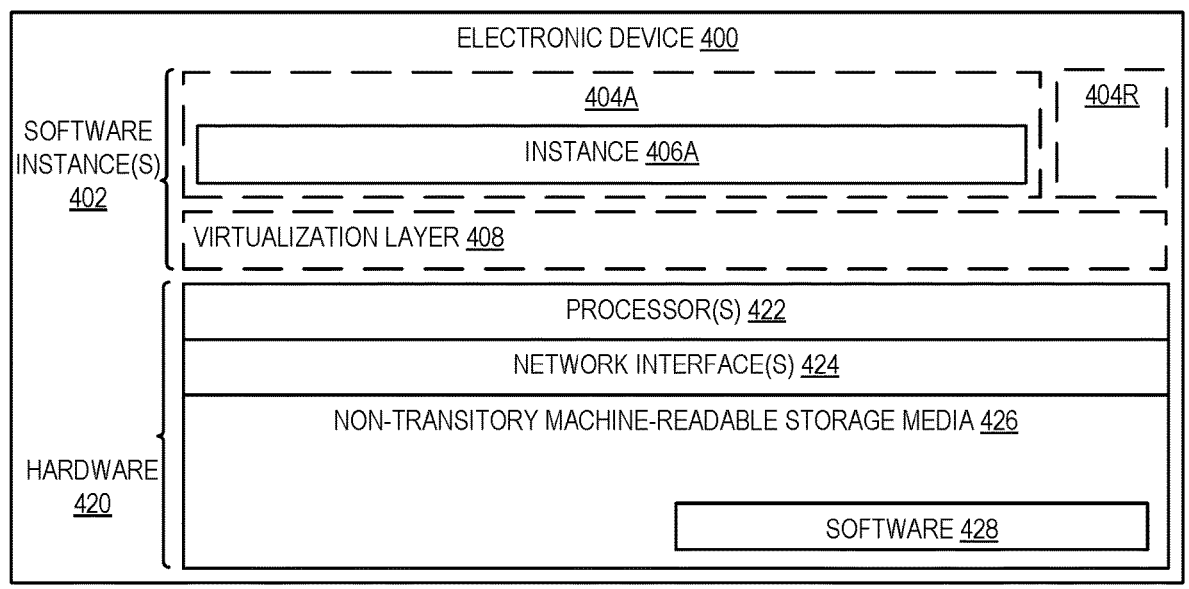
FIG. 4 is a block diagram illustrating an electronic device, according to some embodiments.

FIG. 4 is a block diagram illustrating an electronic device, according to some embodiments. FIG. 4 shows hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Software 428 can include code, which when executed by hardware 420, causes the electronic device 400 to perform operations of one or more embodiments described herein. Thus, as previously mentioned, the web application layer proxy 120 may be implemented in one or more electronic/network devices. Also, the web application clients 110 and the web application server 130 may each be implemented in different electronic/network devices.

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices implementing a web application layer proxy communicatively coupled between a web application client and a web application server for injecting content into a web page provided by the web application server, the method comprising:
   intercepting, by the web application layer proxy, the web page;
   inserting, by the web application layer proxy, scripting language code into the web page that allows the web application client to process web application layer responses to be sent by the web application layer proxy to the web application client;
   sending the web page with the scripting language code inserted to the web application client to cause the web application client to execute the scripting language code when rendering the web page;
   intercepting, by the web application layer proxy, a web application layer request sent by the web application client that is intended for the web application server; and
   responsive to intercepting the web application layer request sent by the web application client, generating and sending, by the web application layer proxy without involvement of the web application server, a web application layer response to the web application client that is to be processed by the web application client using the scripting language code inserted by the web application layer proxy into the web page.

2. The method of claim 1, wherein the scripting language code includes code for the web application client to override a standard web application layer request object with a customized web application layer request object, and wherein the customized web application layer request object provides a customized function that overrides a standard function provided by the standard web application layer request object.

3. The method of claim 2, wherein the standard web application layer request object that is overridden is an XMLHttpRequest object.

4. The method of claim 3, wherein the standard function that is overridden is any one of: a send function and an open function.

5. The method of claim 2, wherein the standard web application layer request object that is overridden is a fetch object.

6. The method of claim 1, wherein the scripting language code includes code for the web application client to manipulate a structure of the web page to display content included in the web application layer response sent by the web application layer proxy to the web application client.

7. The method of claim 6, wherein the content includes a Turing test user interface.

8. The method of claim 6, wherein the content includes a warning page indicating an access violation.

9. The method of claim 1, wherein the scripting language code includes code for redirecting the web application client to another web page.

10. The method of claim 1, wherein the scripting language code further allows the web application client to process web application layer requests to be sent by the web application client to the web application server.

11. The method of claim 10, wherein the scripting language code includes code for the web application client to re-send the web application layer request to the web application server responsive to receiving a further web application layer response from the web application layer proxy.

12. The method of claim 11, wherein the scripting language code further includes code for the web application client to save the web application layer request to be re-sent in a window object or document object provided by a scripting language environment.

13. The method of claim 11, wherein the scripting language code further includes code for the web application client to access a navigation history of the web application client to determine the web application layer request to re-send.

14. The method of claim 1, wherein the scripting language code includes code for the web application client to call a service worker application programming interface (API) to process the web application layer responses to be sent by the web application layer proxy to the web application client and/or web application layer requests to be sent by the web application client to the web application server.

15. The method of claim 1, wherein the scripting language code is inserted into the web page such that it is executed by the web application client before existing scripting language code included in the web page.

16. A set of one or more non-transitory machine-readable storage media storing instructions which, when executed by one or more processors of one or more network devices implementing a web application layer proxy that is communicatively coupled between a web application client and a web application server, causes the one or more network devices to perform operations for injecting content into a web page provided by the web application server, the operations comprising:
  intercepting, by the web application layer proxy, the web page;
  inserting, by the web application layer proxy, scripting language code into the web page that allows the web application client to process web application layer responses to be sent by the web application layer proxy to the web application client;
  sending the web page with the scripting language code inserted to the web application client to cause the web application client to execute the scripting language code when rendering the web page;
  intercepting, by the web application layer proxy, a web application layer request sent by the web application client that is intended for the web application server; and
  responsive to intercepting the web application layer request sent by the web application client, generating and sending, by the web application layer proxy without involvement of the web application server, a web application layer response to the web application client that is to be processed by the web application client using the scripting language code inserted by the web application layer proxy into the web page.

17. The set of one or more non-transitory machine-readable storage media of claim 16, wherein the scripting language code includes code for the web application client to override a standard web application layer request object with a customized web application layer request object, and wherein the customized web application layer request object provides a customized function that overrides a standard function provided by the standard web application layer request object.

18. The set of one or more non-transitory machine-readable storage media of claim 17, wherein the standard web application layer request object that is overridden is an XMLHttpRequest object.

19. A network device configured to implement a web application layer proxy that is to be communicatively coupled between a web application client and a web application server, where the web application layer proxy is configured to inject content into a web page provided by the web application server, the network device comprising:
  one or more processors; and
  a non-transitory machine-readable storage medium having instructions stored therein, which when executed by the one or more processors, causes the network device implementing the web application layer proxy to:
    intercept the web page,
    insert scripting language code into the web page that allows the web application client to process web application layer responses to be sent by the web application layer proxy to the web application client,
    send the web page with the scripting language code inserted to the web application client to cause the web application client to execute the scripting language code when rendering the web page,
    intercept a web application layer request sent by the web application client that is intended for the web application server, and
    responsive to intercepting the web application layer request sent by the web application client, generate and send, without involvement of the web application server, a web application layer response to the web application client that is to be processed by the web application client using the scripting language code inserted by the web application layer proxy into the web page.

20. The network device of claim 19, wherein the scripting language code includes code for the web application client to manipulate a structure of the web page to display content included in the web application layer response sent by the web application layer proxy to the web application client.

* * * * *